Sept. 22, 1936.  A. VANG  2,054,997
INTAKE AND EXHAUST MANIFOLD CONSTRUCTION FOR INTERNAL COMBUSTION ENGINES
Filed April 16, 1936  3 Sheets-Sheet 1
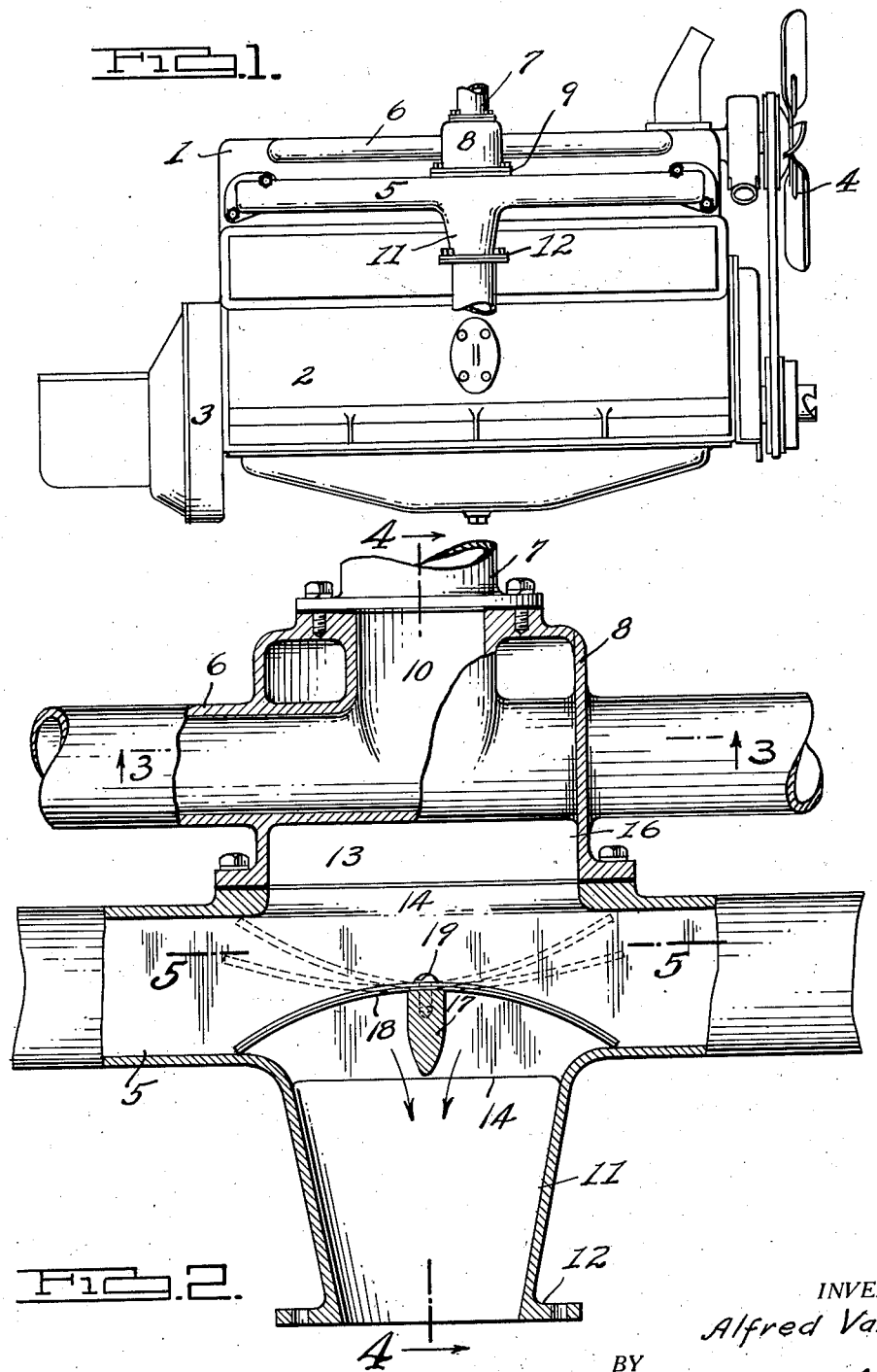
INVENTOR.
Alfred Vang
BY
ATTORNEY.

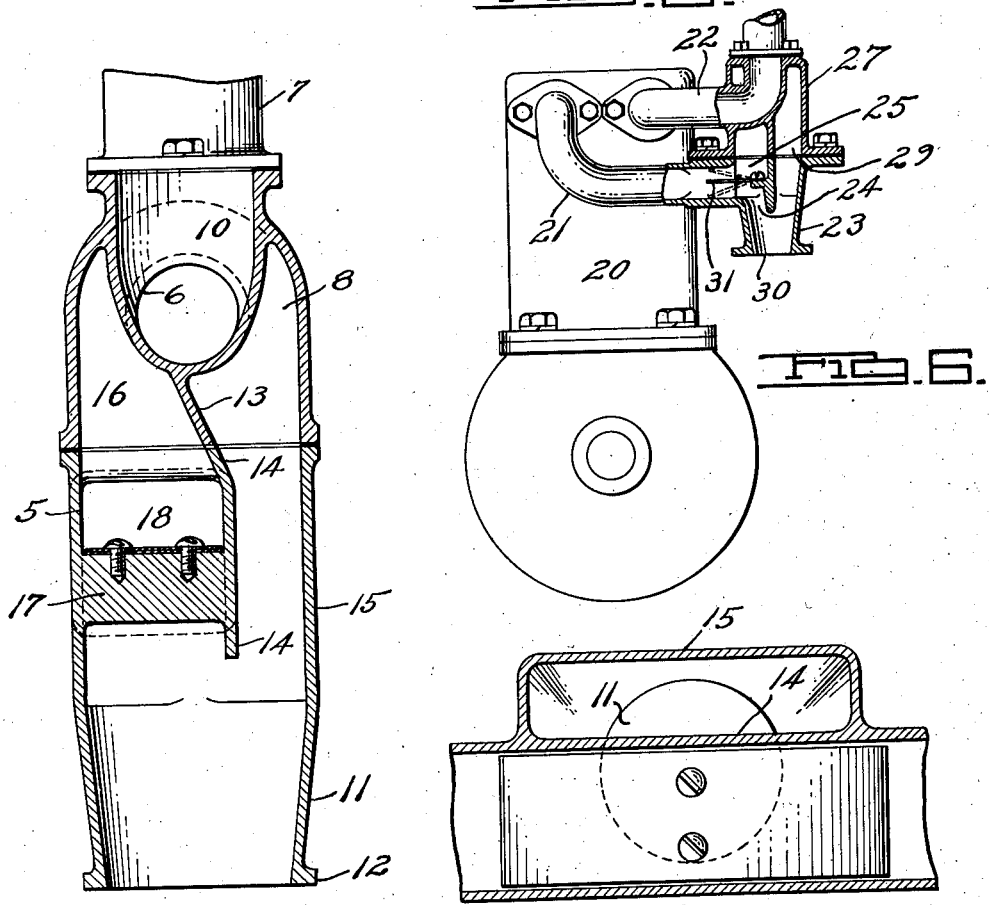

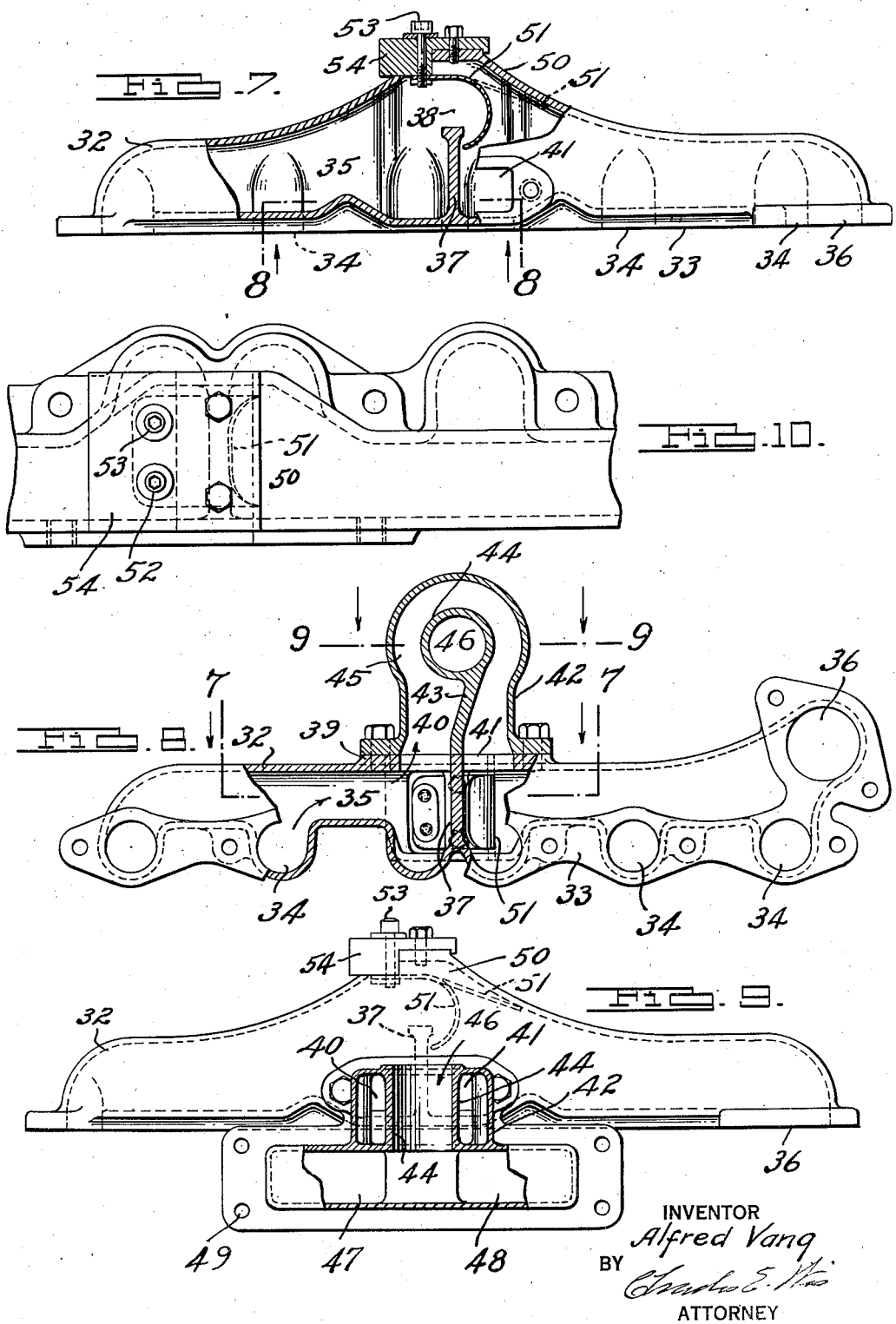

Patented Sept. 22, 1936

2,054,997

UNITED STATES PATENT OFFICE 2,054,997

INTAKE AND EXHAUST MANIFOLD CONSTRUCTION FOR INTERNAL COMBUSTION ENGINES

Alfred Vang, Detroit, Mich., assignor to Vanco Products Company, Detroit, Mich., a corporation of Michigan Application April 16, 1936, Serial No. 74,644

15 Claims. (Cl. 123—122)

This invention relates to an improved intake and exhaust manifold construction for internal combustion engines, the object being to provide an exhaust manifold having inlet ports for connection wth the exhaust ports of the cylinders of the engine and a central discharge branch or outlet on one side of the manifold directly connected with an exhaust conduit and a diametrically opposite branch on the opposite side of the manifold forming a chamber enclosing a portion of the intake manifold preferably adjacent the carburetor, the exhaust manifold having a transverse wall, the plane of which practically coincides with the center plane of the branch outlets of the exhaust manifold and a bimetallic valve plate centrally secured to the transverse wall having opposite ends free to flex by influence of temperature change within the exhaust manifold to at certain temperature close the first named branch outlet for the exhaust manifold and when heated to flex and close the outlet of the exhaust manifold enclosing the intake manifold.

It has heretofore been the practice to provide in an exhaust manifold a valve plate connected with which, either exteriorly or interiorly of the exhaust conduit, is a thermostatic element in the form of a spiral coil so connected with the plate as to vary its position transversely of or parallel with the center plane of an exhaust manifold.

A feature of my invention is in the provision of a fixed mounting for a valve plate within the exhaust conduit where the plate is formed of bimetallic material preferably both the high and low expansion components thereof being a nickel alloy and thus practically rust-proof and capable of withstanding high temperatures for long periods of time without change in deflection characteristic or temperature responsiveness.

These various features of construction may be associated with any type of exhaust manifold in which, when the engine is first started, the heated gases are discharged about the intake manifold to heat the inflowing fuel charge and when a sufficiently high temperature of the gases are flowing in the exhaust manifold to flex and close the outlet to about the intake manifold and opening another section of the manifold connected with an exhaust conduit.

The invention broadly is not confined to the specific form of exhaust manifold herein disclosed but preferably the manifold should be one in which the bypass outlet about the intake manifold is arranged to discharge directly to that branch of the exhaust manifold directly connected with the exhaust conduit, and it is therefore an object and feature of the invention to construct the two outlet branches of the exhaust manifold in a casting having a cap portion for the purpose of readiness in assembly and having channels cast therein as hereinafter more specifically described.

These and other various objects and novel features of the invention are hereinafter more fully described and claimed, and the preferred form of construction of a combined exhaust and intake manifold for internal combustion engines embodying my invention is shown in the accompanying drawings in which—

Fig. 1 is a side elevation of an internal combustion engine showing my improved intake and exhaust manifolds in elevation.

Fig. 2 is an enlarged sectional elevation showing the interior of the exhaust manifold and the outlet branches controlled by the bimetallic valve.

Fig. 3 is a section taken on line 3—3 of Fig. 2.

Fig. 4 is a vertical section taken on lines 4—4 of Fig. 2.

Fig. 5 is a section taken on lines 5—5 of Fig. 2 showing the bimetallic valve plate in plan view.

Fig. 6 is an elevation showing an alternative form of construction of the manifolds and flow control valve.

Fig. 7 is a plan view partly in section of an alternative form of manifold construction showing a thermostatic blade controlling flow of exhaust gases about a fuel intake part of the manifold.

Fig. 8 is a section partially in plan taken on line 8—8 of Fig. 7.

Fig. 9 is a plan view partially in section taken on line 9—9 of Fig. 2.

Fig. 10 is a top plan view of the manifold.

The internal combustion engine may be of any approved form or construction and is here shown as a multi-cylinder type having the cylinders in line and represented by the block 1. No particular description of the engine is here given, it being of well known form having a crank case 2, clutch casing 3 and cooling fan 4.

My improved construction is involved in the exhaust conduit 5 and the intake conduit 6 which has a branch 7 to which the carburetor (not here shown) is attached and this intake conduit is provided practically centrally between the ends thereof with a chamber 8 to which the end of the conduit 7 is secured as shown in Fig. 1. This chamber 8 is flanged at its open lower face at 9 for bolting directly to a similar flange face 10 on the exhaust manifold 5, and the conduit 7 leads directly from a carburetor (not here shown). The side extension 10 on the intake manifold 6 provides a continuation of the conduit 7 and opens directly to the intake manifold and is positioned within the chamber 8 as shown clearly in Fig. 2. The left side chamber 8 as shown in Fig. 4 forms a side extension of the exhaust manifold 5 opening thereto directly opposite the extension 11 of the exhaust manifold which is flanged at 12 for connection with an exhaust conduit (not shown). As shown in Fig. 4, the chamber 8 is provided with a dividing wall 13 terminating flush with the flanged face of the chamber 8 and aligned with the dividing wall 14 forming one side of the exhaust manifold 5.

The exhaust manifold has a side enlargement 15 providing a passageway for gases from the chamber 8 to the exhaust manifold proper and to the outlet 11 for the exhaust manifold and the gases may pass from the exhaust manifold to the passageway 16 of the chamber 8 and thence around the intake manifold at the point of junction with the fuel inlet passageway 10 and thence to the opposite side of the dividing wall 13 and 14 to the exhaust manifold outlet 11.

The exhaust manifold is preferably rectangular in cross section as will be understood more clearly from the dotted lines in Fig. 4 and the inner side wall of the exhaust manifold is extended to provide the wall 14 which extends slightly below the exhaust manifold toward the outlet 11.

It is to be noted that the openings from the exhaust manifold to the outlet 11 and to the passageway 16 to about the intake manifold have a width approximately equal to the exhaust manifold and positioned substantially on a center line passing through the opening to the extension 11 and the opening to the channel 16 is a transverse wall 17, the upper edge of which is approximately on the longitudinal center line of the exhaust manifold. On the upper face of the wall 17 is mounted a bimetallic valve 18 both the high and low sides of which are formed of nickel alloy of such composition, for instance and not by way of limitation as is disclosed in the patent to W. M. Chace, No. 1,642,485, issued September 13, 1927, and thus capable of withstanding high temperature without deterioration or change in deflection characteristics.

The bimetallic valve practically fits the exhaust manifold, as will be understood from Fig. 4, sufficiently close to not bind through edge contact with the manifold walls and still not permit a very material flow of gases between the valve and the manifold wall when in the closed position.

The valve plate 18 is secured centrally between its ends to the transverse wall 17 as by screws 19 the ends of the plate being free to move through influence of temperature change as will be understood clearly from Fig. 2. The position of the valve plate under sufficiently low temperature is shown in full lines in Fig. 2, the ends of the plate being in contact, or nearly so, with the bottom wall of the exhaust manifold and closing the outlet 11 to the exhaust manifold. Under this condition, upon the engine being started, the exhaust gases will be deflected by the bimetallic valve plate from either direction longitudinally of the manifold to the channel way 16 and thence about the intake manifold at the point of junction of the inflowing gases therewith and thence into the manifold outlet 11. The exhaust gases thus immediately heat the portion of the intake manifold housed within the chamber 8 and quickly vaporizes the fuel and as the engine continues in operation and as the bimetallic valve plate 18 is subjected to increasingly higher temperatures it begins to deflect, the opposite ends turning upwardly gradually.

During the gradual heating of the bimetallic valve plate, the outlet 11 is first partially opened to an increasing flow of gases directly from the exhaust manifold and a portion will still pass about the intake manifold through the channel 16 of the chamber 8 and eventually as the heat is increased the bimetallic valve plate will be deflected to the position shown by dotted lines in Fig. 2 practically closing the channel 16 to flow of exhaust gases and fully opening the exhaust manifold to the outlet 11. When the valve has assumed the dotted line position or even before it has finally assumed it, gases flowing toward the outlet from either end of the exhaust manifold are deflected by the bimetallic valve plate into the outlet 11, the transverse wall 17 tending to so change the direction of flow of the exhaust gases as to practically prevent material turbulence as the flow of the gases from each end will be in the direction of the arrows. The side faces of the member 17 are curved somewhat to assist in directing the gas flow from the opposite ends of the exhaust manifold so that they enter the outlet 11 from the said upper ends in practically parallel direction as will be understood from the arrows in Fig. 2. By preventing turbulence in the flow of gases they are not pocketed to any material degree at any point and thus the manifold is prevented from localized overheating or what is termed "hot spots".

The form of the intake and exhaust manifolds here shown, in Figs. 1 to 6 inclusive, is that which would be commonly used with a multi-cylinder engine in which the cylinders are in line and thus the drawings have shown only one form of the invention as by way of example and not by way of limitation as the form of the manifolds and the positions of the outlet for the exhaust manifold in respect to opposite ends thereof and likewise of the chamber 8 in respect to the outlet ends of the intake manifold may vary, the essential characteristic of the invention being that in these forms of the invention the outlet of the exhaust manifold to the exhaust conduit and the outlet to the passageway to about the intake manifold should be on diametrically opposite sides of the manifold so that a bimetallic valve which may be mounted in any appropriate manner whereby, on deflection under cold condition, the exhaust outlet of the exhaust manifold is closed to the flow of the heated gases and by influence of the heated gases to gradually vary its position to cause the exhaust gases to be deflected into the outlet manifold and the outlet to the chamber about the intake manifold is closed to inflow of the heated gases. The construction shown in the heretofore described figures of drawing is the usual form and arrangement of parts for a multi-cylinder engine but the feature of the invention involved is in the provision of the bimetallic valve plate in relationship to the openings to function to close one under one condition and hold the other open and the other under heated condition to close the other and open the one to a flow of exhaust gases as might be realized for instance in a single cylinder engine as indicated in Fig. 6.

In Fig. 6 the engine is shown at 20 as a single cylinder engine having an exhaust and an intake port connected to which the exhaust manifold 21 and the intake manifold 22 are respectively connected. This exhaust manifold has a portion 23 thereof flanged for connection with an exhaust conduit and opens at 24 to the exhaust manifold proper. There is a diametrically opposite opening 25 in the exhaust manifold with which is associated a chamber having a channel portion 26 enclosing the intake manifold and a channel portion 27 leading to the extension 23 of the exhaust manifold below the opening 24. There is thus a dividing wall 29 extending to the intake manifold for causing gases to flow upwardly through the channel 26 and thence through the channel 27 to the outlet. This dividing wall has a ledge 30 extending transversely of the manifold on the longitudinal center line thereof approximately midway between the openings 24 and 25. On this ledge is mounted one end of a bimetallic valve 31, the opposite end being free to deflect as indicated by dotted lines to either close the opening 24 and force the exhaust gases about the intake manifold or on certain high temperature to close the opening 25 and cause gases to flow through the opening 24 to the exhaust conduit (not shown). The function of the valve plate and the construction of the associated manifolds in respect to the diametrically opposite openings in the wall of the exhaust manifold is substantially the same as is indicated in the previous figures of the drawings, the exception being that the bimetallic valve plate in the previous drawings has two opposite free ends and is secured centrally therebetween to the transverse bar.

In Figs. 7 to 10 inclusive is shown another form of exhaust manifold more or less commonly in use with internal combustion engines. This consists of a manifold indicated generally at 32 which has a finished face 33 here shown as having six ports 34, there being one intake port in the exhaust manifold for association with each exhaust port of a multi-cylinder engine. These ports open directly into the main conduit portion 35 having an end portion 36 for connection with an exhaust conduit (not shown), and all the gases discharging into the manifold through the ports 34 normally pass through the conduit portion 35 to the said outlet end 36. Midway of the length of the manifold is a wall 37 extending part way across the manifold from the face 33 toward the opposite side and providing a space or opening 38 through which gases from the ports on the left side of the wall in the structure shown may pass in movement toward the outlet end 36. On the upper face of the manifold conduit 35 is a finished boss 39 and the wall 37 extends into an aperture provided in the boss and has a finished edge flush with the finished surface of the boss and divides the aperture therein into two openings 40 and 41.

As shown in Fig. 8, a housing 42 has a finished face for bolting to the surface of the boss 39 and also has a dividing wall 43 aligning with and engaging the upper edge of the wall 37. This wall 43 terminates in a cylindrical portion 44 about which the outer portion of the casing 42 extends and thus provides a conduit 45 extending from the opening 40 around the portion 44 to the opening 41.

The carburetor or intake line is secured in any approved manner to the housing 42 so that the inflowing fuel charge flows through a conduit like extension 46 and this, as will be seen in Fig. 9, may discharge into an integral casing having outlets 47 and 48 intended to be applied to an intake manifold (not here shown). The apertures 49 provide means for bolting this portion of the housing 42 to an appropriately finished face of the intake manifold.

The exhaust conduit, as shown more particularly in Figs. 7 and 9, has a V like portion 50 opposite the terminal end of the wall 37 and the space 38 between the wall and the outer end of the V portion, as shown in Fig. 7, is of such area as to permit the gases entering the three inlet ports 34 on the left side of the exhaust manifold to pass therethrough and to the portion of the exhaust manifold opening directly to the outlet 36. Likewise gases entering the ports 34 on the right side of these figures of drawing will pass directly to the outlet 36.

The purpose of this structure and the invention disclosed thereby is the same as in the previous structures described—that is, when cold, it is desired to pass a portion of the exhaust gas around the intake manifolds preferably near the carburetor outlet and when hot to permit all the gases to pass to the exhaust manifold outlet 36. For this purpose, in the alternative form of the invention shown in Figs. 7 to 10 inclusive, I have provided a bimetallic blade 51, one end of which is fastened in place by two bolts 52 and 53 which pass through a block 54 having a part lying in the V or cone like portion 50 of the manifold as shown in Fig. 7.

In the said Fig. 7, the blade is shown in section as being curved and with the terminal end engaging the face of the wall 37 toward the outlet 36. It will be seen particularly from the view Fig. 8, that the blade 51 is of a width nearly equal to the width of the conduit portion 35 at that point so that when in the position shown in section in Fig. 7 the greater proportion of the exhaust gases will be prevented from passing through the space 38 between the end of the wall 37 and the opposite part of the V portion 50. When in this position which is the position shown in Fig. 8, the gases from the left side of the exhaust manifold pass through the port 40 and the conduit 45 around the wall 42 forming the portion 46 of the fuel intake, heating the same and passing through the port 41 into the exhaust manifold to discharge through the outlet 36.

When the bimetallic blade or plate 51 begins to heat, it will flex and straighten out gradually as the heat increases and until it attains the position shown by dotted lines in Fig. 7. This opens the passage 38 to flow from the left side of the exhaust manifold and the exhaust gases will no longer pass through the conduit 45 and port 41 as the pressures in the exhaust manifold to which the ports 40 and 41 are open are practically equal and there is no particular restriction to flow of the gases through the passage or opening 38.

The function therefore of the bimetallic blade is the same as in the structures previously described but the difference in construction lies in the fact that there are no oppositely disposed openings in the exhaust manifold to be controlled as is the case in the structures shown in Figs. 1 and 6. Contrarily, there is only one passage to be controlled and that is the passage 38 as in this character of manifold construction there are a sufficient number of cylinders connected therewith to provide ample volume of flow of gases at the temperature to cause the desired variation in position of the bimetallic blade. In the various examples given, which are only typical of the possible variations that may be made in manifold construction, the bimetallic element is directly affected by the temperature of the gases in the manifold and it, itself, acts as a valve element and uninfluenced by atmospheric temperature.

With an internal combustion engine provided with a manifold of the general character described and with the fuel charge affected by the temperature prior to entering the engine, the carburetor may be set for efficient operation of the engine when heated and this carburetor setting need not be changed due to variations in atmospheric temperature. In other words, in my improved construction in any of its forms within the scope of the appended claims, a constant volume of fuel per unit of time may be introduced into the engine and secure the approximately identical operation of the engine under varying degrees of atmospheric temperature.

An automobile having an engine provided with my improved manifold may be driven into the wind or in any direction contrary to the wind flow without materially affecting the engine operation as the temperature of the fuel inlet under the varying conditions stated is practically constant once the engine is warmed up.

In the prior devices the mounting of the thermostatic element, the mounting of the valve and the connections between the thermostatic element and the valve are quite expensive in comparison to my improved construction and subject to rust particularly in the bearings for the rod supporting the valve causing the same to stick and thus render the assembly more or less noneffective in use.

The alternative forms of construction of the invention are indicative of some of the various changes that may be made in the manifold construction and valve plate for securing the same result as is disclosed in respect to the other figures of the drawings.

From the foregoing description, it is believed evident that the various features and objects of the invention are attained by the structures described; that the costs have been reduced materially in comparison to previously known devices for deflecting exhaust gas flow in which a valve plate is actuated by a connection with a thermostatic element in that the number of parts and the cost of the assembly is materially reduced and further, that heat and rust do not affect the operation of my improved device, the valve itself being of such composition as to prevent rust and to withstand high temperature which cause warping and burning of the valve plates of the prior art.

Having thus fully described my invention, its utility and mode of operation, what I claim and desire to secure by Letters Patent of the United States is—

1. A combined intake and exhaust manifold construction for internal combustion engines comprising an exhaust gas manifold, a fuel intake manifold in juxtaposition therewith, the exhaust manifold having an opening in a side wall and an extension associated therewith for connection with an exhaust gas conduit and further having an opening diametrically opposite said first named opening, an extension associated with said last named opening enclosing a portion of the intake manifold and discharging through the first named extension to the exhaust conduit, a bimetallic valve element lying within the exhaust manifold and so arranged and positioned in relation to the two said openings in the opposite side walls thereof that, upon certain low temperatures, the opening to the first named extension of the exhaust manifold is closed and through deflection by increasing temperature the said bimetallic valve moves from such position permitting exhaust gases at certain temperatures to pass through both the said oppositely disposed openings and associated conduit structures to the exhaust manifold discharge outlet and at certain high temperature to move to close the other of the said apertures to flow of exhaust gases and deflecting practically the entire volume of exhaust gases directly to the outlet.

2. A combined intake and exhaust manifold construction for internal combustion engines comprising an exhaust gas manifold, a fuel intake manifold, the exhaust manifold having an opening in its side wall, a conduit like extension associated therewith having an opening in its side wall and arranged for connection with an exhaust gas conduit and further having a diametrically opposite opening having an extension associated therewith enclosing a portion of the intake manifold discharging to the side wall opening of the said conduit like extension, a bimetallic valve supported in the exhaust manifold and having a free end deflecting by influence of temperature when cold to close the outlet of the exhaust manifold leading to the exhaust gas conduit and when sufficiently highly heated deflecting to close the opposite opening and causing substantially the entire body of the exhaust gas to pass directly through the first opening to the exhaust conduit.

3. A combined intake and exhaust manifold construction for internal combustion engines comprising an exhaust gas manifold and a fuel intake manifold in parallel relation, said exhaust manifold having ports for receiving exhaust gases from the cylinders of the engine and an opening in the wall thereof intermediate the ends of the manifold and arranged for connection with an exhaust gas conduit and a diametrically opposite opening having an extension associated therewith enclosing a portion of the intake manifold and arranged to discharge through the said opening of the exhaust gas manifold connected with the exhaust gas conduit, the said extension engaging about the intake manifold intermediate its ends at the point of introduction of fuel charge to the intake manifold whereby the fuel charge as it enters the intake manifold is subjected to the heat of the exhaust gases, and a bimetallic valve in the exhaust manifold positioned in relation to the said diametrically opposite openings of the exhaust manifold to close the opening to the exhaust conduit under certain low temperature to thereby cause the exhaust gases to flow about the intake manifold and thence to the exhaust conduit and when heated to certain high temperature to close the opening to the extension about the intake manifold and causing the exhaust gases to pass directly through the first opening to the exhaust conduit.

4. An exhaust and intake manifold for internal combustion engines comprising an exhaust manifold and an intake manifold lying in parallel relation and respectively connected with the intake and exhaust ports of the engine, the intake manifold having an extension for association with a fuel charge forming device, a conduit associated with the exhaust manifold and discharging to an exhaust conduit, the manifold being interposed in the said last named conduit and having an opening in its opposite side walls at a right angle to the last named conduit, and a bimetallic valve in the exhaust conduit and subject to influence of heat thereof, the said valve at certain low temperature flexing to position to close one of the openings and to deflect gases through the other and at certain high temperature to close the said other opening and deflect the exhaust gases through the first opening.

5. A combined inlet and exhaust manifold for internal combustion engines comprising an exhaust manifold and an intake manifold in parallel relation connected respectively with the exhaust and intake ports of the engine, a housing formed integrally with the exhaust manifold and having a dividing wall separating the housing into two channels, the exhaust manifold having oppositely disposed openings, one of the said openings leading to one of the said channels, the said housing at one end extending to beyond the channels and being common to both the channels and adapted to be connected with an exhaust conduit, a housing formed integrally with the intake manifold having a dividing wall on one side of the intake manifold and mounted on the end of the exhaust manifold housing opposite the end associated with the exhaust conduit, the channel to which the other of the openings of the exhaust manifold opens continuing circuitously about the periphery of the exhaust manifold and discharging to the other channel of the exhaust manifold housing, a transverse bar extending across the exhaust manifold between the said opposite openings therein, and a bimetallic valve mounted on the said bar and extending each way therefrom longitudinally of the exhaust manifold, the free ends of the said bimetallic valve flexing under certain temperature to close the outlet portion of the channel leading to the intake conduit manifold housing and under certain temperature flexing to close the other opening of the manifold to cause deflection of the exhaust gases flowing in the exhaust manifold to the housing about the intake manifold.

6. In an internal combustion engine, an exhaust manifold having an opening to an exhaust port of the engine and a conduit for heated gases opening thereto on diametrically opposite sides, said conduit having an end adapted for association with an exhaust gas conduit and gases in both portions of said conduit discharging through the said first named conduit portion, a fuel intake conduit associated with an intake port of the engine and having a portion thereof lying within one of the sections of the heated gas conduit, and a bimetallic valve secured approximately on a longitudinal center line of the exhaust manifold and having a free end so positioned in relation to the said openings in the said exhaust manifold to which the said conduit opens that the valve while under low temperature will close the opening directly connected with the exhaust conduit to cause the exhaust gas flow through the other opening and when sufficiently highly heated closing said other opening to flow and deflecting the exhaust gases directly through the first opening.

7. In an internal combustion engine, an exhaust manifold having an opening to the exhaust port of the engine and a conduit for heated gases opening thereinto on diametrically opposite sides, said conduit further having an opening for association with an exhaust gas conduit and gases in both portions of the conduit discharging therethrough, a fuel intake having an opening connected with an intake port of the engine and lying within a part of said conduit for heated gases, a bar extending transversely across the exhaust manifold approximately on a center line passing through both said diametrically opposed openings, a bimetalic valve secured in its center plane to the said bar and providing a bimetallic valve plate having the opposite ends free to deflect under influence of variation in temperature and so positioned that when under sufficiently low temperature to close one of the openings in the exhaust conduit and deflecting gases through the other about the intake manifold portion and when heated to sufficiently high temperature to deflect in the opposite direction to close the other opening and deflect the gases through the first named opening.

8. In an internal combustion engine, an exhaust conduit having ports associated with the exhaust ports of the engine and two additional openings connected by conduits to an exhaust gas conduit, a fuel intake manifold having ports associated with the intake ports of the engine and having a portion thereof enclosed in a conduit portion connected with one of the said ports of the exhaust manifold, a bimetallic valve secured practically on a longitudinal center line of the exhaust manifold between the said openings thereof leading to the exhaust conduit, said bimetallic valve plate having both a high and a low side formed of a nickel alloy and capable of withstanding high temperature without impairment of the deflection characteristics, the plate being so mounted as to have free end portions that under certain low temperature will flex and close one of the openings leading to the exhaust conduit and deflect the gases through the other opening to about the enclosed portion of the intake manifold, and under higher temperatures to deflect to a position in which both openings may receive part of the exhaust gas flow and under certain higher temperatures close the other of the said openings and deflect practically all the gases through the first named opening.

9. In an exhaust manifold having openings for association with the exhaust ports of an internal combustion engine and having a pair of openings on diametrically opposite sides thereof through which exhaust gases may flow, a bimetallic plate positioned in the exhaust manifold approximately centrally between the said last named openings and functioning to close one of the openings to flow of gases on certain low temperature leaving the other open to flow and on certain higher temperature closing the other opening and deflecting the gases through the first named opening.

10. In an exhaust manifold having openings for association with the exhaust ports of an internal combustion engine, an opening for discharge of gases therefrom and further having a pair of adjacent openings in the wall thereof, a conduit like member having its opposite ends registering with the said openings through which exhaust gases may flow about a portion of a fuel intake manifold for the engine to heat the same, a bimetallic plate within the exhaust manifold lying at a right angle to the plane of the openings to the conduit like member and having a width approximately equal to the width of the exhaust manifold, said bimetallic plate being so positioned in respect to the exhaust manifold structure as to obstruct the flow of gases in a portion of the exhaust manifold directly to the exhaust manifold outlet and thereby cause the said gases to flow through the said conduit like portion and thence to the exhaust manifold outlet and when heated to flex and permit the gases in the manifold to flow directly to the said outlet.

11. In an exhaust manifold having a series of openings through which the exhaust gases of an associated internal combustion engine may flow and having an exhaust gas outlet at one end, a wall element within the manifold extending from the side having the said openings part way across the manifold and with some of the said ports on that end portion of the manifold having the outlet and the other openings on the opposite side of the wall, a bimetallic plate supported in the wall of the exhaust manifold and having a width to extend across the manifold from side to side at a right angle to the wall, said exhaust manifold having an opening on each side of the said wall, and a conduit like extension having its opposite ends in registration with the openings and extending about a portion of the fuel intake, said bimetallic plate, when cold, flexing to position with its free end engaging the wall and with the wall providing an obstruction to flow of gases through the manifold from that side of the wall opposite the manifold outlet and thereby cause the gases to flow through the said conduit like extension from the said side of the transverse wall to the outlet side of the said wall and when heated to flex and permit the gases from the first named portion of the exhaust gas manifold flow around the wall to the outlet.

12. In an exhaust manifold having openings for association with the exhaust ports of an internal combustion engine and an outlet for the discharge of exhaust gases therefrom and further having a secondary conduit portion enclosing a part of a fuel intake for the engine, a bimetallic plate within the manifold and having a width to lie in close relation to the opposite inner faces of the manifold, said bimetallic plate, when cold, functioning in respect to a portion of the manifold to prevent flow of gases from one end thereof directly to the manifold outlet, and cause the same to flow through the said secondary conduit and when gradually heated through operation of the engine to flex and to gradually decrease the obstruction to flow of gases and correspondingly decrease the flow of gases through the secondary conduit and when fully open to permit gases entering said end of the manifold to flow directly to the outlet.

13. In an exhaust manifold having openings for association with the exhaust ports of an internal combustion engine and an outlet for discharge of exhaust gases therefrom and further having an opening and a conduit associated therewith to extend about a portion of the fuel intake conduit, a wall like element extending from one inner side of the manifold toward and terminating short of the other and forming a partial bar to flow of gases entering one end of the exhaust manifold to the outlet, and a bimetallic plate positioned in the exhaust manifold to, when cold, flex to engagement with the said wall to practically completely bar the flow of gases from said end of the manifold and cause the same to flow through the conduit about the fuel intake manifold and to, on certain increase in temperature, flex and allow exhaust gases from said end to flow around the terminal edge of the wall to the outlet without passing into the said conduit.

14. In an exhaust and intake manifold construction in which the exhaust conduit is provided with a conduit like portion extending about a part of the fuel intake of the intake manifold, a bimetallic plate within the exhaust manifold and subject solely to the influence of the temperature of the exhaust gases so constructed and positioned in respect to the exhaust manifold and the conduit like portion about the intake manifold to, when cold, deflect at least a portion of the exhaust gases entering the manifold into the conduit like extension and on increasing temperature within the exhaust manifold, due to operation of the engine, to gradually deflect and decrease the volume of flow of the exhaust gases through the conduit like extension and when fully heated to permit all the exhaust gases to flow directly to the exhaust manifold outlet.

15. In an exhaust manifold for internal combustion engines a conduit like portion extending about the fuel intake for the said engine and having an outlet, a bimetallic plate in the manifold so positioned therein that when cold it is flexed to position to obstruct the flow of gases through the manifold to the outlet and to cause the same to pass about the fuel intake and when heated to certain degree to flex to position unobstructive to flow of gases to the exhaust manifold outlet.

ALFRED VANG.